(12) United States Patent
Schewe et al.

(10) Patent No.: US 11,060,592 B2
(45) Date of Patent: Jul. 13, 2021

(54) LINEAR ACTUATOR

(71) Applicant: LINAK A/S, Nordborg (DK)

(72) Inventors: Brian Schewe, Sønderborg (DK); Martin Kahr Knudsen, Sydals (DK); Henrik Skovby, Sydals (DK); René Sørensen, Gråsten (DK)

(73) Assignee: LINAK A/S, Nordborg (DK)

( * ) Notice: Subject to any disclaimer, the term of this patent is extended or adjusted under 35 U.S.C. 154(b) by 0 days.

(21) Appl. No.: 16/626,424

(22) PCT Filed: Jun. 28, 2018

(86) PCT No.: PCT/DK2018/000029
§ 371 (c)(1),
(2) Date: Dec. 24, 2019

(87) PCT Pub. No.: WO2019/001653
PCT Pub. Date: Jan. 3, 2019

(65) Prior Publication Data
US 2020/0116242 A1     Apr. 16, 2020

(30) Foreign Application Priority Data
Jun. 28, 2017 (DK) .......................... PA 2017 00390

(51) Int. Cl.
*F16H 25/20* (2006.01)
*F16B 5/06* (2006.01)

(52) U.S. Cl.
CPC ............... *F16H 25/20* (2013.01); *F16B 5/06* (2013.01); *F16H 2025/209* (2013.01);
(Continued)

(58) Field of Classification Search
CPC ............. F16H 25/20; F16H 2025/2031; F16H 2025/2037; F16H 2025/2084; F16H 2025/209; F16B 5/06
See application file for complete search history.

(56) References Cited

U.S. PATENT DOCUMENTS 2,417,195 A    3/1947  Hargreaves
3,612,331 A * 10/1971  Jorgensen ................ B01J 3/002
                                                        220/581
(Continued)

FOREIGN PATENT DOCUMENTS

DE    102005033629 A1   2/2006
DE    102005059129 A1   6/2007
(Continued)

*Primary Examiner* — David M Fenstermacher
(74) *Attorney, Agent, or Firm* — Dykema Gossett PLLC

(57) ABSTRACT

The present invention relates to a linear actuator comprising a console (2), an outer tube connected to the console, an electric motor, a transmission, and a spindle in connection with the transmission. The linear actuator comprises a spindle nut on the spindle and an inner tube connected to the spindle nut. The spindle nut and the inner tube are guided inside the outer tube. For mounting the linear actuator, a rear end is equipped with a rear mounting (5) and a front end of the inner tube is equipped with a front mounting. In such a linear actuator the rear mounting should be mounted to the housing in a simple manner. To this end, the console (2) comprises a first fixing geometry (18) having a number of first fingers (19) distributed in the circumferential direction around the axis and the rear mounting (5) comprises a second fixing geometry (20) as negative form of the first fixing geometry, wherein the first fixing geometry and the second fixing geometry form an overlapping region.

10 Claims, 3 Drawing Sheets

(52) U.S. Cl.
CPC .............. *F16H 2025/2031* (2013.01); *F16H 2025/2037* (2013.01); *F16H 2025/2084* (2013.01)

(56) References Cited

U.S. PATENT DOCUMENTS

| | | | | |
|---|---|---|---|---|
| 3,657,582 | A * | 4/1972 | Phelon | H02K 1/2786 |
| | | | | 310/156.31 |
| 3,790,922 | A * | 2/1974 | Normann | H01R 13/74 |
| | | | | 439/544 |
| 4,513,214 | A * | 4/1985 | Dieringer | H02K 5/148 |
| | | | | 310/112 |
| 4,707,627 | A * | 11/1987 | Best | H02K 3/522 |
| | | | | 310/260 |
| 8,443,685 | B2 * | 5/2013 | Wu | F16H 25/12 |
| | | | | 74/89.35 |
| 9,312,738 | B2 * | 4/2016 | Winther | H02K 7/06 |
| 9,899,889 | B2 * | 2/2018 | Miyashita | H02K 5/161 |
| 9,989,133 | B2 * | 6/2018 | Wu | F16H 57/039 |
| 10,461,605 | B2 * | 10/2019 | Gassner | H02K 5/26 |
| 2010/0236342 | A1 | 9/2010 | Tseng | |
| 2014/0312724 | A1 | 10/2014 | Hung | |

FOREIGN PATENT DOCUMENTS

| | | |
|---|---|---|
| WO | 0229284 A1 | 4/2002 |
| WO | 2011057631 A1 | 5/2011 |
| WO | 2012083951 A1 | 6/2012 |

\* cited by examiner

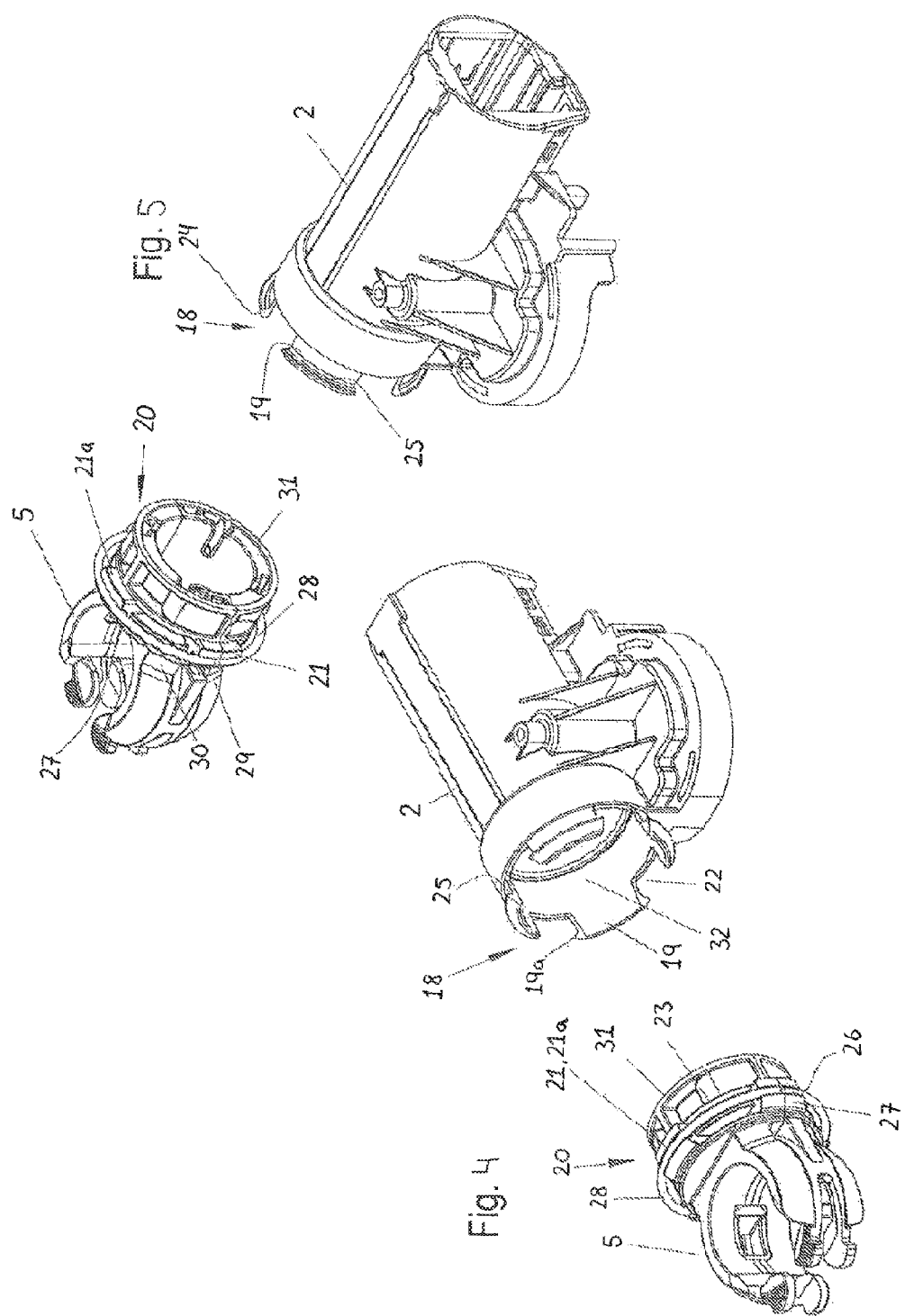

LINEAR ACTUATOR

CROSS-REFERENCE TO RELATED APPLICATIONS

This application is a national stage filing based upon international application no. PCT/DK2018/000029, filed 28 Jun. 2018 (the '029 application), and published in English on 3 Jan. 2019 under international publication no. WO 2019/001653 A1, which claims priority to Denmark (DK) patent application no. PA 2017 00390, filed 28 Jun. 2017 (the '390 application). The '029 application and the '390 application are both hereby incorporated by reference as though fully set forth herein.

The present invention relates to a linear actuator comprising a reversible electric motor and a gear. The gear comprises a worm driven by the motor and engaging a worm wheel. The worm wheel is rotatably fixed to a spindle which is arranged in the outer tube. A spindle nut is in threaded engagement with the spindle and is, via engagement with outer tube, fixed against rotation. An inner tube is connected to the spindle nut. When the spindle rotates, the inner tube is moved along the longitudinal axis of the spindle and thereby in or out of the outer tube. The direction of movement depends on the direction of rotation of the spindle. For mounting the linear actuator, a rear end is equipped with a rear mounting and a front end of the inner tube is equipped with a front mounting.

The rear mounting of linear actuators is traditionally a separate part which is secured to the linear actuator by means of screws, see WO2012/083951 A1 to LINAK A/S, or held in place by a housing encapsulating a part of the linear actuator, see e.g. WO2011/057631 A1 to LINAK A/S. These types of rear mountings require a large number of assembly operations.

The object underlying the invention is to provide a simple manner of mounting a rear mounting to a linear actuator without a housing.

This object is solved with a linear actuator according to the preamble of claim 1, where the console comprises a first fixing geometry having a number of first fingers distributed in circumferential direction around the axis, and the rear mounting comprises a second fixing geometry as negative form of the first fixing geometry, wherein the first fixing geometry and the second fixing geometry form an overlapping region.

Such a construction simplifies the mounting of the rear mounting to the console. The second fixing geometry will merely have to be inserted into the first fixing geometry to define the relative position between the rear mounting and the console. Thereafter or at the same time, a connection between the rear mounting and the console can be established.

In an embodiment of the invention, a spring ring is arranged in the overlapping region. The spring ring can be used to prevent a lateral movement between the console and the rear mounting in a direction perpendicular to the longitudinal axis of the spindle. Furthermore, the spring ring can be used as fixing means.

In an embodiment of the invention, the spring ring is positioned in the overlapping region between at least a first protrusion at the first fixing geometry on a side facing away from the rear mounting and at least a second protrusion at the second fixing geometry on a side facing away from the housing. In this way, the rear mounting is secured in the console against pulling forces. When pulling forces arise, the spring ring is clamped between the two protrusions and blocks any movement of the rear mounting in a direction out of the console.

In an embodiment of the invention, the first fixing geometry comprises an inclined front face facing the rear mounting. In this case, it is possible to pre-assemble the spring ring on the second fixing geometry and then push the rear mounting onto the console. The inclined front face of the first fixing geometry then widens the spring ring so that it can pass the first protrusion and snaps radially inwards behind the first protrusion. In this way, it is not only possible to establish a well-defined geometrical relation between the console and the rear mounting, but to fix the rear mounting to the console at the same time.

In an embodiment of the invention, the spring ring is axially fixed on the second fixing geometry. The position of the spring ring relative to the longitudinal axis of the spindle cannot change during mounting. Therefore, it is possible to widen the spring ring when the second geometry is pushed into the first geometry so that no additional means are necessary.

In an embodiment of the invention, the spring ring is positioned on the second fixing geometry between the second protrusion and a holding geometry. The holding geometry can be formed, for example, by a further protrusion which is arranged on a side of the second protrusion facing away from the console.

In an embodiment of the invention, the spring ring comprises a gap along its circumference. The spring ring can be made, for example, from a spring wire of metal or plastic. When the gap along the circumference is present, it is possible to widen the inner diameter of the spring ring without deforming the material of the spring ring.

In an embodiment of the invention, the rear mounting comprises at least two parts which are held together by the spring ring. The spring ring is in this case a mounting aid for mounting the rear mounting before connecting it to the console.

In an embodiment of the invention, the first fixing geometry and the second fixing geometry are mountable to each other in at least two different angular positions. The angular positions can be, for example, off set relative to each other by 90°.

In an embodiment of the invention, the first fingers have the same width in circumferential direction and the second fixing geometry comprises a corresponding number of second fingers of the same width in the circumferential direction, the width of the second fingers in circumferential direction being equal to a width of the gaps between the first fingers in the circumferential direction. The first fingers and the second fingers are preferably distributed evenly in circumferential direction. Furthermore, it is preferred that the width of the gap and the width of the fingers are equal.

An embodiment of the invention will now be described in more detail with reference to the drawing, in which:

FIG. 4 shows a perspective exploded view of the rear mounting and the console, and FIG. 5 shows an exploded perspective view of the rear mounting and the console seen from another angle.

Figure 1:
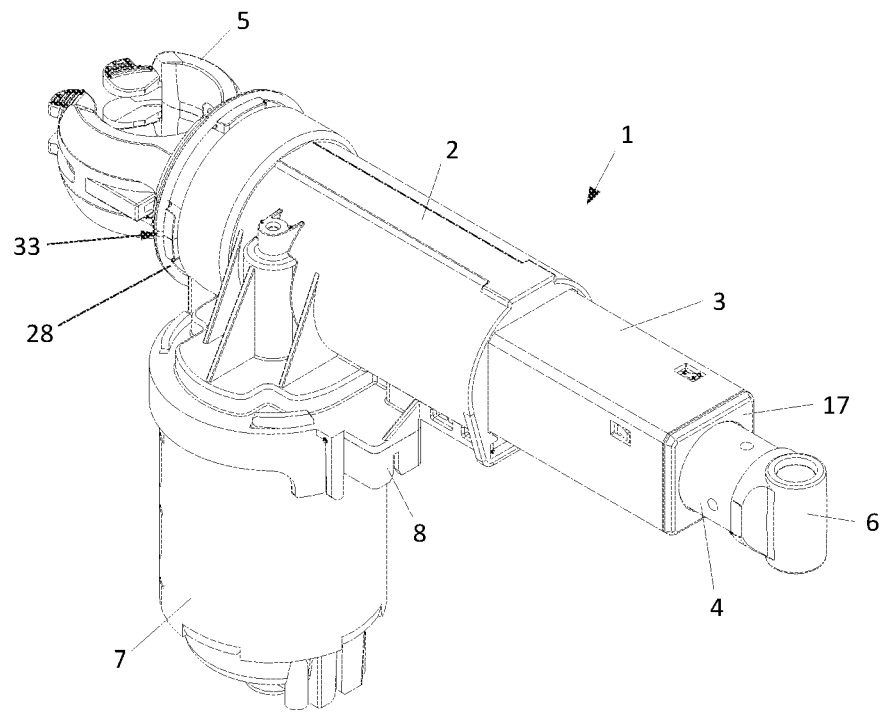
FIG. 1 shows a perspective view of a linear actuator.

FIG. 1 shows a perspective of a linear actuator 1 comprising a console 2, an outer tube 3 and an inner tube 4 guided in this. For mounting the linear actuator, a rear end is equipped with a rear mounting 5 and a front end of the inner tube 4 is equipped with a front mounting 6. As it appears from both FIG. 1 and FIG. 2, the linear actuator 1 comprises an electric motor 7, typically a reversible electric motor, which can be either a DC or AC motor for low voltage or mains voltage. The electric motor 7 is mounted to the bottom of the console 2 and the rear mounting 5 is mounted to the rear end of the console 2.

The linear actuator 1 comprises a socket 8 for connecting the linear actuator 1 to a power supply or an electric controller. The outer tube 3 comprises a rectangular section, in particular a square section, i.e. the outer tube 3 comprises four walls 9, 10, 11, 12.

The linear actuator 1 further comprises a spindle 13, driven by the electric motor 7 through a transmission 14, which is a worm gear, where an extension of the shaft of the electric motor 7 is designed as a worm (not shown) in engagement with a worm wheel 15, mounted on the spindle 13.

A spindle nut 16 with internal threads engage the external threads of the spindle 13. The spindle nut 16 is guided inside the outer tube 3 and is secured against rotation.

The front most part of the spindle nut 16 is adapted for receiving the inner tube 4. More specifically, the rear part of the inner tube 4 can be fastened to the spindle nut 16 via corresponding threads on both parts, or the spindle nut 16 can have a projecting edge or shoulder on which the inner tube 4 can be accommodated. Activation of the motor 7 will, via the transmission 14, cause the spindle 13 to rotate, whereby the spindle nut 16 and inner tube 4 will travel along the longitudinal axis of the spindle 13 in a direction depending on the direction of rotation of the electric motor 7.

The front end of the outer tube 3 comprises a bushing 17 for guiding the inner tube 4. The bushing 17 can be designed with a seal to prevent ingress of dust and moisture between the bushing 17 and outer tube 3 and the inner tube 4, respectively.

The rear mounting 5 is a part which is separate from the console 2, as can be seen in FIGS. 4 and 5. FIGS. 4 and 5 only show the rear mounting 5 and the console 2 without the outer tube 3 and the electric motor 7.

At its rear end, the console 2 comprises a first fixing geometry 18 having a number of first fingers 19 distributed in the circumferential direction of the longitudinal axis of the spindle 13. The rear mounting 5 comprises a second fixing geometry 20 which is a negative form of the first fixing geometry 18. In other words, the second fixing geometry 20 comprises a number of second fingers 21 corresponding to the number of first fingers 19. In the present case there are four first fingers 19 and four second fingers 21.

In the first fixing geometry 18, there are gaps 22 between the first fingers 19. The width of the gaps 22 in the circumferential direction corresponds to the width of the second fingers 21 in the circumferential direction. In other words, the second fingers 21 fit exactly into the gaps 22 of the first fixing geometry 18. In a similar way, the second fixing geometry 20 comprises a number of second gaps 23. The widths of the second gaps 23 in the circumferential direction correspond to the widths of the first fingers 19 of the first fixing geometry 18.

The first fixing geometry 18 comprises an inclined front face 24. At the back side of the inclined front face 24, the first fingers 19 comprise a collar 25 which is generally perpendicular to the longitudinal axis of the spindle 13.

In a similar way, the second fingers 21 comprise a side 26 facing away from the console 2 which is generally perpendicular to the longitudinal axis of the spindle 13. An additional holding geometry 27 is assigned to each of the second fingers 21.

A spring ring 28 is held between the second fingers 21 and the holding geometry 27. In other words, the spring ring 28 is axially fixed on the rear mounting 5. Hence, the second fingers 21 and the holding geometry 27 form a slit in which the spring ring 28 is fixed.

The rear mounting 5 comprises two parts 29, 30 which are held together by the spring ring 28 before mounting the rear mounting 5 to the console 2.

The pre-assembled rear mounting 5, i.e. the two parts 29, 30 held together by a spring ring 28, is inserted into the rear end of the console 2 so that the second fingers 21 enter the first gaps 22. During the movement of the rear mounting 5 into the console 2, the spring ring 28 is brought into contact with the inclined surface 24. When the rear mounting 5 is pushed with a sufficient force, the spring ring 28 widens or yields, i.e. enlarges its inner diameter so that it can pass the protrusion 19a of the first fingers 19 and snaps radially inwards once it has passed the first protrusions 19a. Now the first fixing geometry 18 and the second fixing geometry 20 form an overlapping region between the first protrusion 19a of the first fixing geometry 18 and the second protrusion 21a of the second fixing geometry 20. The pre-stress of the spring ring 28 and the stiffness of the first fingers 19 can also be designed to enable the first fingers 19 to deflect when the rear mounting 5 is pushed into the console 2.

Figure 2:
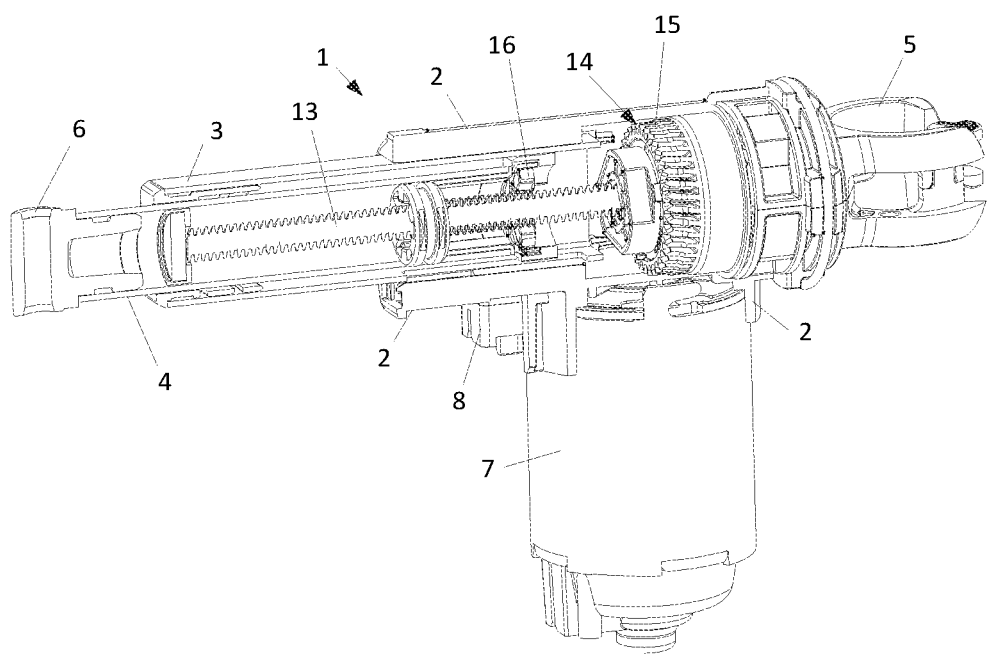
FIG. 2 shows a perspective view of a linear actuator with a longitudinal partial section.
Figure 3:
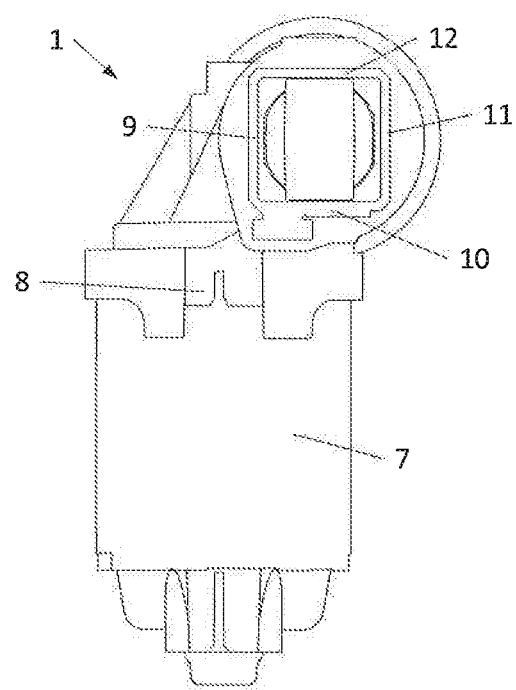
FIG. 3 shows a front view of a linear actuator.

As can be seen in FIGS. 1 and 2, the spring ring 28 is now positioned between the first protrusion 19a of the console 2 and the second protrusion 21a of the rear mounting 5. When the rear mounting 5 is exposed to pulling forces, i.e. forces trying to pull the rear mounting 5 out of the console 2, the spring ring 28 is clamped between the first protrusion 19a and the second protrusions 21a and prevents the rear mounting 5 from being pulled out of the console 2.

In an embodiment, the spring ring 28 is not continuous along its circumference but has a gap 33 (FIG. 1). In this way the diameter of the spring ring 28 can be enlarged without stretching the material of the spring ring 28. The spring ring 28 can be made from a spring wire of metal or plastic.

In the present embodiment, the spring ring 28 is arranged outside the console 2. It is also possible to arrange it inside the console 2, so that it can yield to a smaller diameter.

All gaps 22 are of equal width in the circumferential direction. The same is the case for the width of the first fingers 19. It is therefore possible to mount the rear mounting 5 to the console 2 in the first orientation as shown, and in a second orientation in which the rear mounting 5 is rotated by 90° relative to the longitudinal axis of the spindle 13.

The second protrusions 21a can be realized by the second fingers 21 themselves.

The rear mounting 5 comprises a cylinder-like continuation 31 which is adapted to a cylindrical accommodation space 32 in the console 2. The continuation 31 facilitates the insertion of the rear mounting 5 into the console 2.

The invention claimed is:

1. A linear actuator (1) comprising: a console (2), an outer tube (3) connected to the console (2), an electric motor (7), a transmission (14), and a spindle (13) in connection with the transmission (14), a spindle nut (16) on the spindle (13), an inner tube (4) connected to the spindle nut (16), and where the spindle nut (16) and the inner tube (4) are guided inside the outer tube (3), and the rear mounting (5) secured to a rear end of the console (2), wherein the console (2) comprises a first fixing geometry (18) having a number of first fingers (19) distributed in the circumferential direction around the longitudinal axis of the spindle (13) and the rear mounting (5) comprises a second fixing geometry (20) as negative form of the first fixing geometry (18), wherein the first fixing geometry (18) and the second fixing geometry (20) form an overlapping region.

2. The linear actuator according to claim 1, further comprising a spring ring (28) is-arranged in the overlapping region.

3. The linear actuator according to claim 2, wherein the spring ring (28) is positioned in the overlapping region between at least a first protrusion (19a) at the first fixing geometry (18) on a side (25) facing away from the rear mounting (5) and at least a second protrusion (21a) at the second fixing geometry (28) on a side (26) facing away from the console (2).

4. The linear actuator according to claim 3, wherein the first fixing geometry (18) comprises an inclined front face (24) facing the rear mounting (5).

5. The linear actuator according to claim 3, wherein the spring ring (28) is axially fixed on the second fixing geometry (20).

6. The linear actuator according to claim 5, wherein the spring ring (28) is positioned on the second fixing geometry (20) between the second protrusion (21a) and a holding geometry (27).

7. The linear actuator according to claim 2, wherein the spring ring (28) comprises a gap along its circumference.

8. The linear actuator according to claim 2, wherein the rear mounting (5) comprises at least two parts (29, 30) which are held together by the spring ring (28).

9. The linear actuator according to claim 1, wherein the first fixing geometry (18) and the second fixing geometry (20) are mountable to each other in at least two different angular positions.

10. The linear actuator according to claim 1, wherein the first fingers (19) have the same width in the circumferential direction and the second fixing geometry comprises a corresponding number of second fingers (21) of the same width in the circumferential direction, the widths of the second fingers (21) in the circumferential direction being equal to a width of gaps (22) between the first fingers (19) in the circumferential direction.

* * * * *